March 7, 1967 B. K. BIGLAND 3,307,219
MANUFACTURE OF PLASTIC FILM
Filed Feb. 16, 1966 3 Sheets-Sheet 3

INVENTOR.
BERNARD K. BIGLAND
BY
Bierman & Bierman

United States Patent Office 3,307,219
Patented Mar. 7, 1967

3,307,219
MANUFACTURE OF PLASTIC FILM
Bernard K. Bigland, Ainsworth, Bolton, England, assignor to Bemis Company, Inc., Minneapolis, Minn., a corporation of Missouri
Filed Feb. 16, 1966, Ser. No. 527,875
7 Claims. (Cl. 18—14)

The present application is a continuation-in-part of applicant's Serial No. 222,126 filed September 7, 1962, entitled, "Manufacture of Plastic Film."

The invention relates to the manufacture of plastic film, such as is now extensively used for packaging and made from polyethylene, polystyrene, polyvinylchloride or other film-forming plastics.

One known system of manufacture of such film which for the purpose of identification will be termed the "bubble type" consists in using a plastic extrusion machine to feed material to a die head which may be arranged to deliver the film as a tube, either horizontally or vertically (up or down). The extruded tube is inflated by air pressure, so that the tube is expanded to the desired diameter. It is the action of air pressure in the bubble type which affects and controls the expansion of the tube.

Another prior art method, which may be called the "mandrel" type, extrudes a hot plastic tube from the die and passes it, with little or no increase of diameter to a cooled mandrel. The extruded tube is supported between the die and the mandrel by means of air introduced interiorly of the tube to support the same. This air does not expand the tube as in the "bubble type."

In both systems, the extruded tube is drawn off through nip rollers.

One fundamental difference between the aforesaid "bubble" and "mandrel" methods lies therefore in the different use of the air introduced into the extruded tube.

The said bubble process involves several problems and in particular as regards temperature and control of the "blown" tube size, both of which are factors determining the accuracy of film gauge and speed of production. The extruded tube must be hot as it emerges from the die whilst it must thereafter be cooled before passing through the nip rollers which close this end of the bubble. As previously stated, the tube is expanded and due to this expansion and controlled speeds of the nip rollers and extruder output the tube is stretched both transversely by the air bubble and longitudinally by the relative speed of the nip rollers. These conditions limit the speed of production. In fact, the speed at which "blown" film can be produced is largely determined by the initial temperature of extrusion and the available effective degree of cooling. Furthermore, the quality of film produced, particularly as regards clarity, is a direct function of the temperature which should be as high as possible, whilst the blown length is determined by the effectiveness of cooling, and control of diameter becomes increasingly difficult, as such length is increased. Also problems arise from distortion of the blown shape if the force of external air cooling is unduly increased.

All the above problems result in limiting production speed or deterioration in film quality.

In another bubble type method of production the extruded tube is expanded by air pressure to the diameter of a former of known fixed diameter which former is used only as a seal for such end of the air bubble, a coolant and lubricant being introduced to ensure the seal and to prevent sticking to the former. The use of such liquids in contact with the film brings its own special problems, since they are difficult to remove from the film, and may destroy the quality of the film through spot cooling.

In the aforesaid mandrel type method of production the extruded tube passes from the die to a mandrel of only slightly greater diameter than the die. The mandrel is cooled so as to shock cool the tube and thereby cause the tube to give increased resistance to being pulled over the end of the mandrel. The necessary tension to pull the tube over the mandrel is provided by the nip rollers and such pull physically produces a substantial amount of longitudinal stretch. The transverse stretch is relatively negligible, as is evident from the comparative diameters of the tube at the die and the diameter of the mandrel.

The present invention is based upon the appreciation of the aforesaid prior art and the conception of an entirely new method of and apparatus for, producing plastic film with the objects of increasing the speed of production and improving the quality of the film.

It is also among the objects of the invention to provide a means of longitudinally and transversely stretching the tube under better controlled conditions whilst at the same time producing a uniform thickness thereof.

The invention comprises a method of forming an extruded tube of a plastic material such as polyethylene including the steps of extruding the material as a tubular film having walls of greater thickness than the required finished wall thickness and passing said tube over a former of substantially greater diameter whilst providing an air cushion between the inner wall of the tube and the outer surface of said former.

The invention also comprises the method of forming an extruded tube which includes the further step of applying cooling air against the outside of said tubular film in the region of said former to fully set the tube after it has been physically stretched over the air cushion on the former.

The invention further comprises the method of forming an extruded tube which includes the further step of determining the diameter of the extruded tube by varying the effective size of said former by using an expandible former.

Also according to the invention the apparatus for forming an extruded tube of a plastic material such as polyethylene comprises means for extruding the material from a die as a tubular film having walls of greater thickness than the required finished wall thickness, a former of substantially greater diameter than the die aperture, means for passing said tubular film over said former, and means for providing an air cushion on the outer surface of said former.

More specifically, there is provided an extrusion die from which the hot plastic tube emerges and passes over the former of substantially greater diameter and finally between a pair of nip rollers for pulling the tube over the former. Between the die and former a high velocity current of air is directed against the inner wall of the tube to form an air cushion over the former. It is important that the former be of substantially larger diameter than the die aperture and convex to provide an arc over which the hot tube passes and in which stage the diameter thereof increases. During this passage the tube is partially set so that it now offers resistance to the pull of the rollers and thus is physically stretched longitudinally as well as transversely while in such condition. Immediately thereafter, an externally applied current of cold air fed by a ring of jets fully sets the plastic and stabilizes the tube. Preferably the jets impinge at or above the horizontal diameter of the former, which is a toroid in the specific form shown.

This apparatus differs from the prior art in a fundamental manner in that the pull of the nip rollers combined with the former acts physically to stretch the tubular film both laterally as well as longitudinally.

The invention will now be described, by way of example only, with reference to the accompanying drawings, which show apparatus according to one embodiment of the invention.

Figure 1:
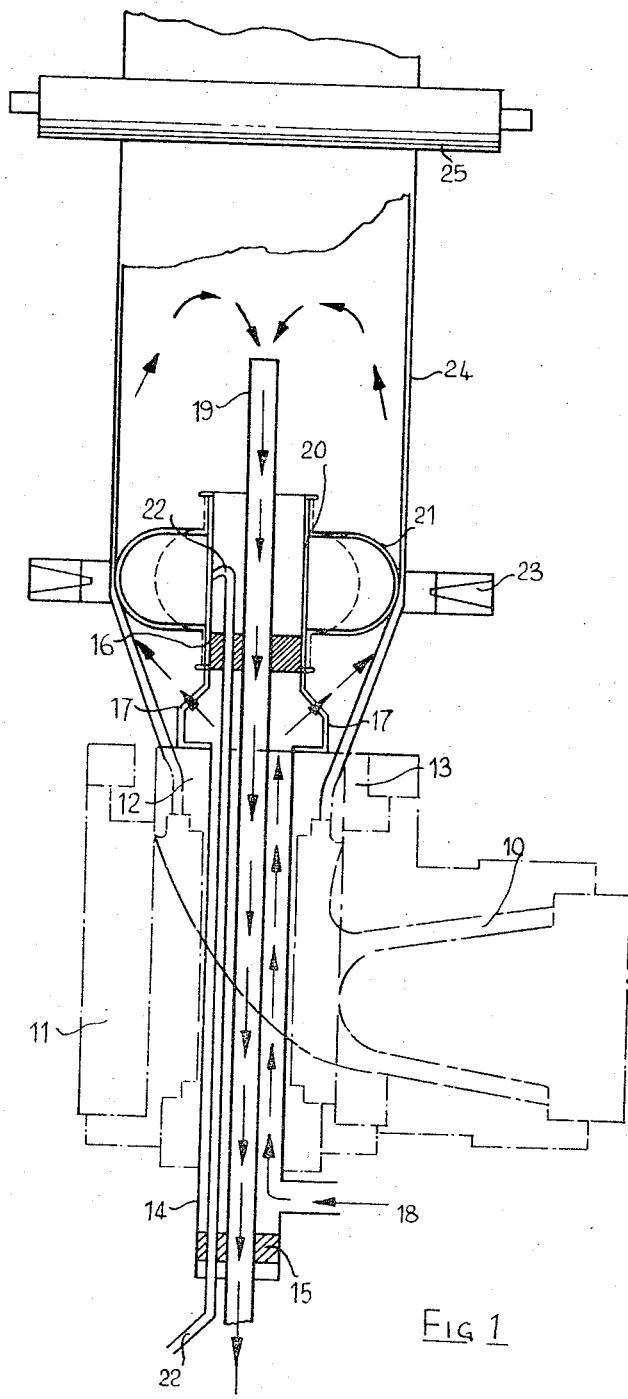
FIG. 1 is a vertical section of the apparatus used at the delivery end of a plastic extrusion machine.
Figure 2:
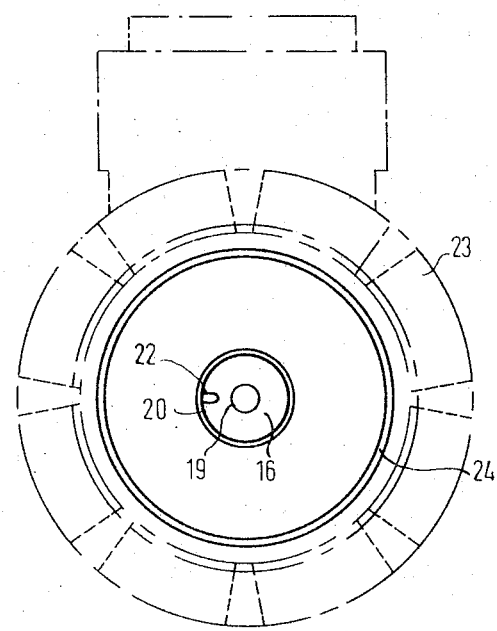
FIG. 2 is a plan view of the apparatus of FIG. 1.
Figure 3:
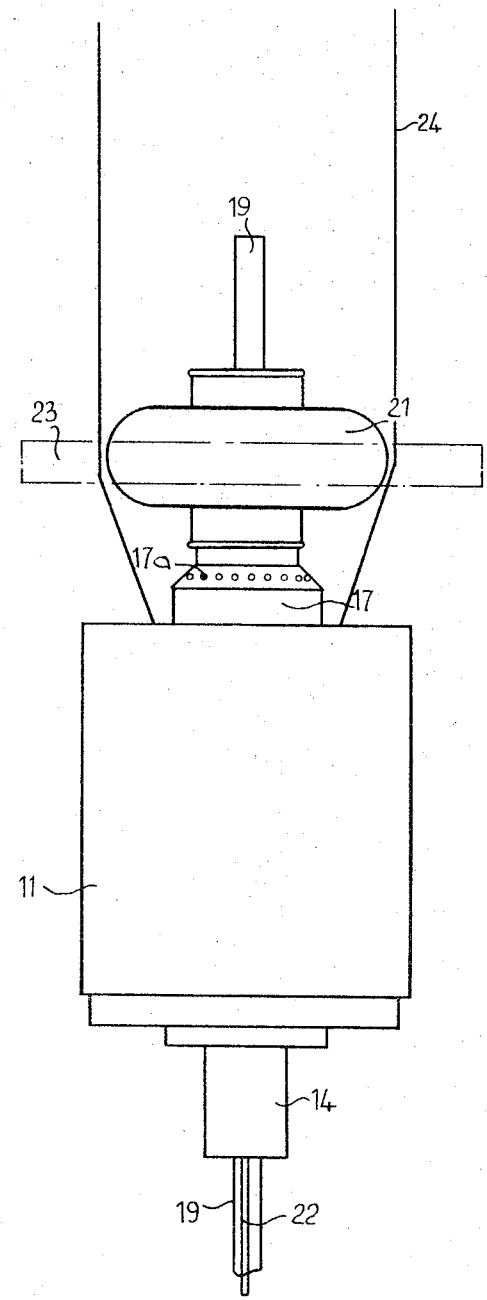
FIG. 3 is a side elevation of the apparatus of FIG. 1 in the direction of arrow A.

Referring now to the drawings, a continuous feed plastic extrusion machine (not shown) forces a plastic melt through the channel 10 to the die head 11, of which the die itself comprises an inner mandrel 12, and an outer die-ring 13. Supporting and passing upwardly through the mandrel 12 is a cylindrical tube 14 closed at its ends by plugs 15 and 16. The upper end of the tube 14 is provided with a nozzle 17 having both radially and axially spaced perforations 17a above the mandrel 12, whilst its lower end is provided with an air inlet 18, which is connected to a fan or compressor (not shown). A cylindrical tube 19 of somewhat smaller diameter than the tube 14 passes centrally through the plugs 15 and 16, and has an open end somewhat above the upper end of tube 14. Adjacent to the upper extremity of the tube 14, and attached to the upper end of the nozzle 17 and fixed externally thereto is a circular member 20 which serves to support an inflatable former which is shown as toroidal member 21, the deflated shape of which is shown in dotted line. A pipe 22 passes from the toroidal member 21 and downwardly through the plug 16, tube 14 and plug 15, adjacent the tube 19. The lower end of the pipe 22 is connected to a supply of compressed air via suitable valve means (not shown). The nozzle 17 is so shaped and the perforations 17a therein so located as to direct the air jets therefrom upwardly and outwardly tangentially of the periphery of the toroid.

An air cooling ring, generally indicated at 23, is positioned outside and opposite the toroidal member 21, at or above the maximum diameter thereof, and is spaced somewhat therefrom, with its outlets directed thereto.

FIG. 1 shows the apparatus in use extruding a thin walled cylindrical plastic tube 24 which passes between nip rollers, generally indicated at 25, to suitable take-up mechanism (not shown).

The purpose and function of the various integers of the apparatus will be apparent from the following description of the operation of the machine.

On starting the machine, the supplies of air to the cooling ring 23, inlet 18, and pipe 22, are shut off, and the toroidal member 21 is in the deflated state indicated by dotted lines on FIG. 1. The extrusion machine is started, and a comparatively thick-walled plastic tube is extruded from the die head 11 and being of greater diameter than the deflated toroidal member is easily manipulated over the same. The plastic tube is manipulated upwardly between the toroidal member 21 and then air ring 23, and thence to the nip rollers 25 of the take-up mechanism. The inlet 18, is then opened and compressed air flows up the tube 14, through the perforations 17a and upwardly to form an air cushion between the plastic tube 24 and the toroidal member 21 and into the volume sealed by the nip rollers 25 and thence out through the tube 19, as generally indicated by the arrows on FIG. 1. At this stage a controlled quantity of air is admitted into the pipe 22, causing the toroidal member 21 to inflate, thus increasing the diameter of the plastic tube 24. The resultant thickness of the tube wall is a function of the extruder output, the speed of the nip rollers and the inflated diameter of the toroidal member.

The plastic tube 24 while still hot passes over the toroidal member 21, supported on a cushion of air, since the air from the perforations 17a is directed tangentially between the inner wall of the plastic tube 24 and the toroidal member 21 at such velocity as is necessary to maintain the air cushion.

The cooling ring 23 can next be brought into operation and can emit large quantities of air without distorting the plastic tube 24 since the latter is inwardly supported against the air blast by the air cushion and the toroidal member 21. Thus, more efficient cooling can be effected than has hitherto been possible, and as a consequence, the plastic may be extruded at a substantially higher temperature, which allows a greater speed of production, and a better quality of product to be realised.

Furthermore, very rigid control can be maintained during production, as the diameter of the plastic tube 24, may readily be corrected by admitting or releasing a small quantity of air to or from the toroidal member 21, thus varying its diameter as may be necessary.

The tube in passing from the die to the point of contact with the air cushion is stretched both transversely and longitudinally and again while passing over the arc of contact with the air cushion is cooled and partially set and in such condition is physically further stretched both transversely and longitudinally by the pull obtained from the nip rollers.

It will be appreciated that the scope of the invention is in no way limited by the above example, many variations being possible. For example, the toroidal member 21 could be inflated by a liquid which could circulate therein to give added cooling. Also, it would be possible to use a mechanically expandable former in place of the inflatable toroidal member 21.

Applicant considers that the operation of the invention is based on the following: The former is sufficiently cool to partially set the plastic at which stage it is still stretchable. The air passing over the former is under only sufficient velocity to maintain the air cushion. The tube passes over a substantial arc or area of the surface of the former during the said further stretching; at this stage, the tension of the nip rollers causes the further stretching and thinning of the partially set plastic. Finally, the conditions maintained above the top of the arc sets the plastic firmly so the toroid are such that no distortion of or damage to the tube can take place.

Further, the whole apparatus could be modified so as to extrude the thin walled plastic tube downwardly or horizontally.

What is claimed is:

1. Apparatus for forming an extruded tube of plastic material comprising a die for extruding a tubular film of said material, a convex former adjacent to said die, said former being of greater diameter than the die orifice, and having its outer periphery convexly curved relative to the inner surface of the film, means beyond the former for applying tension to said film, means for escape of air from beyond the former, means for directing a stream of air at such velocity into the angle between the inner face of the film and the outer face of the former to provide and maintain an air cushion on the surface thereof to prevent contact of said tube with said former, means for pulling said tube over the air cushion on a substantial arc of said former so partially setting said tube by said air cushion, said tube resisting tension thereon, a ring of air jets adapted to impinge air on the outer face of said tube at said arc area to cool and set said plastic material simultaneously with stretching of said film, whereby the tension of said means is sufficient to physically stretch said tube over the area of said arc to reduce the thickness of said film by both longitudinal and transverse stretching.

2. Apparatus according to claim 1 characterised in that the former is inflatable to change its diameter.

3. Apparatus according to claim 1 characterised in that a vertical pipe passes centrally through said apparatus and supplies said air to said tube and former.

4. Apparatus according to claim 1 characterised in that said former is toroidal.

5. Apparatus according to claim 1 characterised in that said former is toroidal and is anchored to a central pipe.

6. Apparatus according to claim 1 characterised in that the former is inflatable to change its diameter, a ring of air jets impinges air on the outer face of said tube at said arc area, a vertical pipe passes centrally through said apparatus and supplies said air to said tube and stretcher, said stretcher is toroidal and is anchored to a central pipe.

7. Apparatus according to claim 6 characterised in that said die is below said former and said tension means are above said former.

References Cited by the Examiner

UNITED STATES PATENTS

| | | | |
|---|---|---|---|
| 2,433,937 | 10/1945 | Tornberg | 18—14 |
| 2,832,994 | 5/1958 | Ahlich et al. | 18—14 |
| 2,966,700 | 1/1961 | Dyer et al. | 18—14 |
| 3,235,632 | 2/1966 | Lemmer et al. | 18—14 X |

WILLIAM J. STEPHENSON, *Primary Examiner.*